(12) United States Patent
Klimpel et al.

(10) Patent No.: US 11,548,488 B2
(45) Date of Patent: Jan. 10, 2023

(54) CONTROL DEVICES FOR MOTORIZED PRESSURE BUILD-UP DEVICES AND METHOD FOR TRANSMITTING AT LEAST ONE PIECE OF INFORMATION BETWEEN TWO MOTORIZED PRESSURE BUILD-UP DEVICES

(71) Applicant: Robert Bosch GmbH, Stuttgart (DE)

(72) Inventors: Sebastian Klimpel, Stuttgart (DE); Martin Wolff, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 17/049,797

(22) PCT Filed: Jul. 22, 2019

(86) PCT No.: PCT/EP2019/069643
§ 371 (c)(1),
(2) Date: Oct. 22, 2020

(87) PCT Pub. No.: WO2020/025373
PCT Pub. Date: Feb. 6, 2020

(65) Prior Publication Data
US 2021/0245721 A1    Aug. 12, 2021

(30) Foreign Application Priority Data
Jul. 30, 2018 (DE) .................... 10 2018 212 637.2

(51) Int. Cl.
*B60T 8/32* (2006.01)
*B60T 7/04* (2006.01)
(Continued)

(52) U.S. Cl.
CPC ............ *B60T 8/3265* (2013.01); *B60T 7/042* (2013.01); *B60T 8/171* (2013.01); *B60T 8/885* (2013.01);
(Continued)

(58) Field of Classification Search
CPC ........ B60T 8/3265; B60T 7/042; B60T 8/171; B60T 8/885; B60T 13/58; B60T 13/74;
(Continued)

(56) References Cited

U.S. PATENT DOCUMENTS 5,709,438 A * 1/1998 Isakson .................. B60T 8/442
303/114.1
10,556,577 B2 * 2/2020 Kunz ..................... B60T 13/686
(Continued)

FOREIGN PATENT DOCUMENTS

DE     102012212407 A1    1/2014
DE     102013208671 A1    11/2014
(Continued)

OTHER PUBLICATIONS

International Search Report for PCT/EP2019/069643, dated Nov. 4, 2019.

*Primary Examiner* — Pamela Rodriguez
(74) *Attorney, Agent, or Firm* — Norton Rose Fulbright US LLP; Gerard A. Messina

(57) ABSTRACT

A control device for a first motorized pressure build-up device of a braking system of a vehicle. The control device is designed to output at least one first piece of information to an activation device of a second motorized pressure build-up device of the braking system by, under consideration of the respective first piece of information, a first motor activatable in such a way that a pressure prevailing in at least one partial volume of the braking system is varied in accordance with a pressure change signal, which is interpretable as the respective first piece of information for the activation device using a second pressure sensor unit of the second motorized pressure build-up device.

13 Claims, 2 Drawing Sheets

(51) Int. Cl.
    *B60T 8/171*      (2006.01)
    *B60T 8/88*      (2006.01)
    *B60T 13/58*      (2006.01)
    *B60T 13/66*      (2006.01)
    *B60T 17/22*      (2006.01)
    *B60T 13/18*      (2006.01)
    *B60T 13/74*      (2006.01)

(52) U.S. Cl.
    CPC ............ *B60T 13/58* (2013.01); *B60T 13/662* (2013.01); *B60T 17/221* (2013.01); *B60T 13/18* (2013.01); *B60T 13/74* (2013.01); *B60T 2270/402* (2013.01); *B60T 2270/404* (2013.01); *B60T 2270/82* (2013.01); *B60T 2270/88* (2013.01)

(58) Field of Classification Search
    CPC ............... B60T 13/662; B60T 2270/88; B60T 2270/402; B60T 2270/404; B60T 2270/82; B60T 17/221; B60T 13/18
    See application file for complete search history.

(56) References Cited

U.S. PATENT DOCUMENTS

2016/0075319 A1*    3/2016    Kistner ................... B60T 7/042
                                                                 701/70
2017/0297546 A1    10/2017    Takeda et al.

FOREIGN PATENT DOCUMENTS

| | | |
|---|---|---|
| DE | 102015202337 A1 | 8/2016 |
| DE | 102015204757 A1 | 9/2016 |
| DE | 102016211982 A1 | 1/2018 |
| DE | 102016224250 A1 | 6/2018 |
| WO | 2016136671 A1 | 9/2016 |

* cited by examiner

CONTROL DEVICES FOR MOTORIZED
PRESSURE BUILD-UP DEVICES AND
METHOD FOR TRANSMITTING AT LEAST
ONE PIECE OF INFORMATION BETWEEN
TWO MOTORIZED PRESSURE BUILD-UP
DEVICES

FIELD

The present invention relates to control devices for one motorized pressure build-up device each of a braking system of a vehicle. The present invention also relates to motorized pressure build-up devices for a braking system of a vehicle and to a braking system for a vehicle. In addition, the present invention relates to a method for transmitting at least one piece of information between two motorized pressure build-up devices of a braking system of a vehicle.

BACKGROUND INFORMATION

Control devices for activating at least one motorized pressure build-up device of a braking system of a vehicle such as, for example, a brake booster and/or at least one hydraulic unit of the braking system are described, for example, in German Patent Application No. DE 10 2015 202 337 A1.

SUMMARY

The present invention provides a control device for a first motorized pressure build-up device of a braking system of a vehicle, an activation device for a second motorized pressure build-up device of the braking system for cooperating with the control device, a motorized pressure build-up device for a braking system of a vehicle, a braking system for a vehicle, and a method for transmitting at least one piece of information between two motorized pressure build-up devices of a braking system of a vehicle.

The present invention provides possibilities for transmitting at least one piece of information between two different motorized pressure build-up devices of a braking system of a vehicle without the use of an electrical communication system such as, for example, a vehicle bus system. The present invention may, in particular, enable a bidirectional communication between the two different motorized pressure build-up devices of the respective braking system without a signal having to be forwarded for this purpose via the at least one vehicle bus system. Instead, the present invention provides for a "hydraulic interface" between the two different motorized pressure build-up devices of the same braking system, which may be utilized instead of or in addition to the at least one vehicle bus system. The "hydraulic interface" provided with the aid of the present invention expands the possibilities for transmitting the at least one piece of information between the two different motorized pressure build-up devices, in particular, in the case of an error. Even in the case of a complete electrical communication failure at the vehicle, it is still possible to transmit the at least one piece of information via the "hydraulic interface" between the two different motorized pressure-build up devices, so that the two motorized pressure-build up devices continue to combine their functionality and in this way are able to reliably effectuate a brake application of the vehicle. The present invention thus contributes significantly to alleviating a traditionally frequently critical driving situation.

In one advantageous specific embodiment of the present invention, the control device is designed, under consideration of the respective first piece of information, to activate the first motor in such a way that, with the aid of the operation of the activated first motor, the pressure prevailing in the at least partial volume of the braking system is varied in accordance with a sinusoidal or binary pressure change signal, which is interpretable as the respective first piece of information for the activation device using the second pressure sensor unit. An exact transmission of information by the control device of the first motorized pressure build-up device to the activation device of the second motorized pressure build-up device is possible with the aid of a sinusoidal or binary pressure change signal. One further advantage of a use of sinusoidal or binary pressure change signals for transmitting pieces of information is that such pressure change signals are reliably detectable with the aid of a pressure measuring unit that is comparatively advantageous and requires relatively little installation space.

On a first memory unit of the control device, for example, one pressure change instruction each may be stored for the at least one first piece of information relating to the pressure change signal interpretable as the respective first piece of information for the activation device, the control device being designed, under consideration of the pressure change instruction read out in each case from the first memory unit, to activate the first motor in such a way that, with the aid of the operation of the activated first motor, the pressure prevailing in at least the partial volume of the braking system is varied in accordance with the corresponding pressure change signal. By equipping the control device with such a first memory unit, it is possible to easily design the control device for outputting a multitude of pieces of information to the activation device of the second motorized pressure build-up device.

The at least one first piece of information outputtable to the control device of the second motorized pressure build-up device is preferably a driver braking input specification ascertained by at least one braking input detection unit of the first motorized pressure build-up device relating to a driver braking input signaled by a driver with the aid of his/her actuation of a brake actuation element of the vehicle, at least one setpoint parameter established by the control device relating to a setpoint operating mode to be carried out with the aid of the second motorized pressure build-up device and/or at least one error message relating to an error present at the control device and/or at at least one component of the first motorized pressure build-up device. In this case, the activation device is able to reliably adapt the operation of the second motor of the second motorized pressure build-up device activated by it to the driver braking input specification corresponding to the setpoint operating mode to be carried out and/or corresponding to the error present at the control device and/or at the at least one component of the first motorized pressure build-up device.

As an advantageous refinement of the present invention, the activation device may also be designed to output at least one second piece of information to the control device of the first motorized pressure build-up device by designing the activation device, under consideration of the respective second piece of information, to activate the second motor in such a way that, with the aid of the operation of the activated second motor, the pressure prevailing in the at least partial volume of the braking system is varied in accordance with a pressure change signal, which is interpretable as the respective second piece of information for the control device using a first pressure sensor unit of the first motorized pressure build-up device. The control device may also be designed to receive the at least one second piece of information output by the activation device of the second motorized pressure build-up device in that, once a first pressure sensor unit of the first motorized pressure build-up device detects a pressure change signal triggered with the aid of the operation of the second motor of the second motorized pressure build-up device in at least the partial volume of the braking system, and outputting a sensor signal corresponding to the detected pressure change signal to the control device, the control device is designed to read out the corresponding second piece of information from the output sensor signal. Thus, a bidirectional communication between the control device and the activation device is also possible with the aid of the refinements of the control device and the activation device described herein.

In one advantageous specific embodiment of the activation device in accordance with the present invention, the corresponding first piece of information for the respective sensor signal corresponding to the pressure change signal is stored on a second memory unit of the activation device, the activation device being designed to read out the first piece of information stored for the respective sensor signal from the second memory unit. With the aid of an easily implementable equipment of the activation device with the second memory unit and a programming of the second memory unit requiring only minimal effort, it is thus possible to design the activation device for receiving a plurality of pieces of information.

The advantages described above are also ensured in a motorized pressure build-up device for a braking system of a vehicle including a corresponding control device or including such an activation device.

The motorized pressure build-up device is preferably an electromechanical brake booster positionable or positioned upstream from the main brake cylinder, a pump system including at least one pump, a motorized piston-cylinder device, an integrated power brake or an electrical wheel brake. The present invention may thus be used for a multitude of motorized pressure build-up devices traditionally already employed in vehicle braking systems.

A braking system for a vehicle including a corresponding first motorized pressure build-up device and such a second motorized pressure build-up device also provides the above-described advantages.

In addition, an implementation of a corresponding method for transmitting at least one piece of information between two motorized pressure build-up devices of a braking system of a vehicle also yields the above-described advantages. It is expressly noted that it is possible to refine the method for transmitting at least one piece of information between two motorized pressure build-up devices according to the specific embodiments of the control device and of the activation device explained above.

BRIEF DESCRIPTION OF THE DRAWINGS

Further features and advantages of the present invention are explained below with reference to the FIGS.

DETAILED DESCRIPTION OF EXAMPLE EMBODIMENTS

Figure 1A:
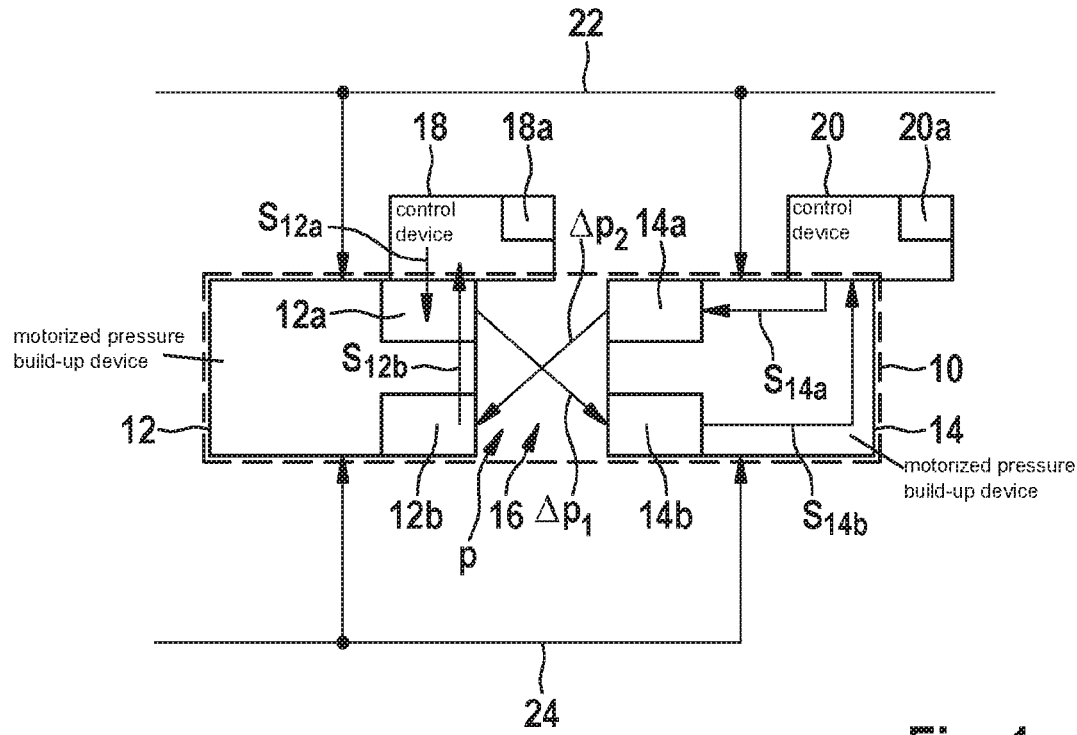
FIG. 1a and 1b schematically show representations of specific embodiments of the control device and the activation device, or of the braking system equipped therewith, and a coordinate system for explaining their functionalities, in accordance with the present invention.
Figure 1B:
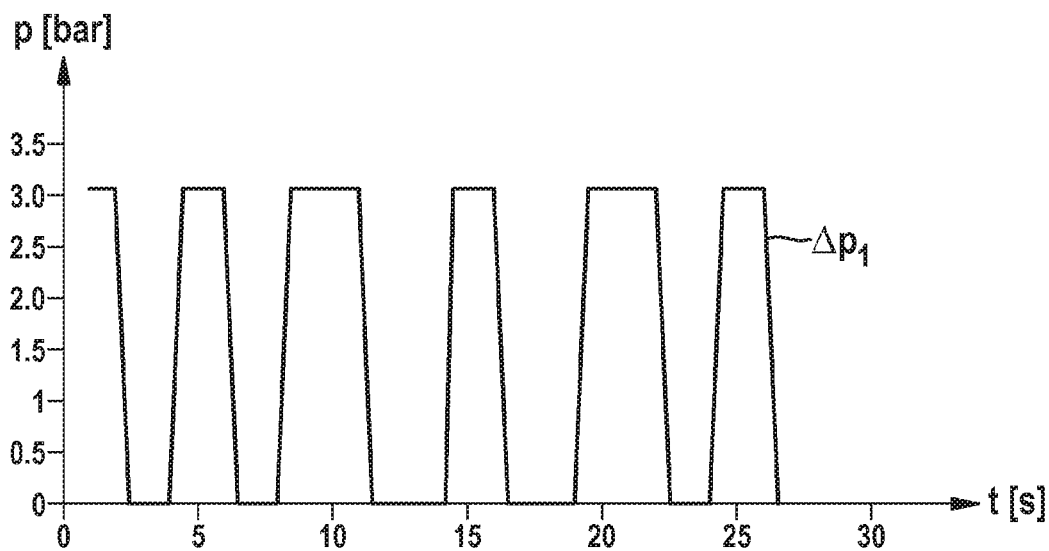

FIG. 1a and 1b schematically show representations of specific embodiments of the control device and of the activation device, or of the braking system equipped therewith, and a coordinate system for explaining their functionalities.

Braking system 10 merely schematically depicted in FIG. 1a includes a first motorized pressure build-up device 12 and a second motorized pressure build-up device 14. Motorized pressure build-up devices 12 and 14 may also be referred to as a primary actuator and a secondary actuator of braking system 10. Each of motorized pressure build-up devices 12 and 14 includes a separate motor 12a and 14a. In addition, each of motorized pressure build-up devices 12 and 14 is designed (regardless of the other motorized pressure build-up device 12 or 14) to increase a pressure p prevailing in at least one partial volume 16 of braking system 10 with the aid of an operation of its motor 12a or 14a. In this way, it is possible to increase at least one braking pressure in at least one wheel brake cylinder (not shown) of braking system 10 with the aid of pressure p increased in at least partial volume 16 of braking system 10. Braking system 10 equipped with the two motorized pressure build-up devices 12 and 14 may, for example, be a power braking system or a power-assisted braking system. It is expressly noted, however, that a usability of a (first) control device 18 of first motorized pressure build-up device 12 described below and of an also explained activation device/second control device 20 of second motorized pressure build-up device 14 or of motorized pressure build-up devices 12 and 14, is not limited to any particular braking system type of braking system 10 nor to any specific vehicle type/motor vehicle type of a vehicle/motor vehicle equipped with braking system 10.

Control device 18 of first motorized pressure build-up device 12 is designed to activate first motor 12a of first motorized pressure build-up device 12 with the aid of at least one control signal $S_{12a}$ in such a way that, with the aid of an operation of activated first motor 12a, pressure p prevailing in at least partial volume 16 of braking system 10 is variable/is varied. In addition, control device 18 is designed to output at least one first piece of information to activation device 20 of second motorized pressure build-up device 14. For this purpose, control device 18 is designed, under consideration of the respective first piece of information, to activate first motor 12a in such a way that, with the aid of the operation of the activated first motor, pressure p prevailing in at least partial volume 16 of braking system 10 is varied with the aid of the operation of activated first motor 12a in accordance with a pressure change signal $\Delta p_1$, which is interpretable as the respective first piece of information for activation device 20 of second motorized pressure build-up device 14 using a second pressure sensor unit 14b of second motorized pressure build-up device 14. A difference between minimal values and maximum values of pressure change signal $\Delta p_1$ may, for example, be between 1 bar to 10 bar, preferably between 1 bar to 5 bar.

Activation device 20 of second motorized pressure build-up device 14 is designed to activate second motor 14a of second motorized pressure build-up device 14 with the aid of at least one control signal $S_{14a}$ in such a way that also with the aid of the operation of the activated second motor, pressure p prevailing in at least partial volume 16 of braking system 10 is variable/is varied. Second motor 14a of second motorized pressure build-up device 14 is activated with the aid of activation device 20 under consideration of at least one sensor signal $S_{14b}$ output by second pressure sensor unit 14b. Second motorized pressure build-up device 14 is preferably an ABS system or an ESP system (ESC system), which is conventionally already designed having a pressure sensor employable as second pressure sensor unit 14b.

Activation device 20 may also interact with control device 18 by also designing activation device 20 to receive the at least one first piece of information output by control device 18 of first motorized pressure build-up device 12. Once second pressure sensor unit 14b of second motorized pressure build-up device 14 detects pressure change signal $\Delta_{p1}$ (and corresponding to the first piece of information) effectuated with the aid of the operation of first motor 12a of first motorized pressure build-up device 12 in at least partial volume 16 of braking system 10, and outputs a sensor signal $S_{14b}$ corresponding to detected pressure change signal $\Delta p_1$ to activation device 10, activation device 20 is designed to read out the corresponding first piece of information from output sensor signal $S_{14}b$.

The designs of control device 18 and activation device 20 interacting therewith described above thus provide a "hydraulic interface," via which control device 18 and activation device 20 are interconnected. The at least one piece of information (as pressure modulation) may be transmittable/may be transmitted via the "hydraulic interface" by control device 18 to activation device 20. In the example of FIG. 1a, control device 18 and activation device 20, or their motorized pressure build-up devices 12 and 14, are interconnected via a first electrical network 22 and via a second electrical network 24. First electrical network 22 and second electrical network 24 may, for example, each be a vehicle bus system. Since, however, the at least one first piece of information is transmittable by control device 18 to activation device 20 due to the implemented "hydraulic interface," at least one of electrical networks 22 and 24 may nevertheless be easily conserved. Moreover, the "hydraulic interface" implemented by control device 18 and activation device 20 is not/is barely adversely affected by a simultaneous failure of electrical networks 22 and 24, for example, due to water ingress or a short-circuit. While such an error scenario traditionally impedes any transmission of information by control device 18 to activation device 20, the at least one first piece of information may still easily be transmitted by control device 18 to activation device 20 via the "hydraulic interface," even in the case of a simultaneous failure of electrical networks 22 and 24. In addition, the "hydraulic interface" is producible in a relatively cost-efficient manner and with comparatively little effort.

Control device 18 is preferably designed to output a plurality of first pieces of information to activation device 20 and activation device 20 is designed to receive the plurality of first pieces of information from control device 18. For this purpose, one pressure change instruction each relating to pressure change signal $\Delta p_1$ interpretable as the respective first piece of information for activation device 20 may be stored on a first memory unit 18a of control device 18 for each first piece of information of the plurality of first pieces of information. Control device 18 is then designed, under consideration of the pressure change instruction read out in each case from first memory unit 18a, to activate first motor 12a in such a way that, with the aid of the operation of the activated first motor 12a, pressure p prevailing in at least partial volume 16 of the braking system is varied in accordance with corresponding pressure change signal $\Delta p_1$. The advantageous design of activation device 20 for receiving the plurality of first pieces of information is implementable, for example, by storing the corresponding first piece of information on a second memory unit 20a of activation device 20 for each sensor signal $S_{14b}$ output as a response to a detected pressure signal $\Delta p_1$ (corresponding to one of the plurality of first pieces of information) by second pressure senor unit 14b to activation device 20. Activation device 20 is then designed to read out from second memory unit 20a the first piece of information stored for the respective sensor signal $S_{14b}$. A design of control device 18 and activation unit 20 for transmitting a plurality of first pieces of information from control device 18 to activation device 20 is therefore implementable in a relatively cost-efficient manner.

A measured value ascertained with the aid of a sensor system of first motorized pressure build-up device 12 or provided to first motorized pressure build-up device 12 may be transmittable as the at least one first piece of information. For example, a driver braking input specification, ascertained by at least one braking input detection unit (not shown) of the first motorized pressure build-up device 12, relating to a driver braking input signaled by a driver with the aid of an actuation of a brake actuation element (not shown) of the vehicle may be transmitted as the at least one first piece of information to activation device 20. If first motorized pressure build-up device 12 is designed as an electromechanical brake booster positionable or positioned upstream from a main brake cylinder of braking system 10, first motorized pressure build-up device 12 generally has a pedal travel sensor/rod travel sensor and/or a differential travel sensor as its at least one braking input detection unit. As a result, the driver braking input specification may be continuously ascertained with the aid of the braking input detection unit of first motorized pressure build-up device 12 and may be transmitted as the at least one first piece of information via the "hydraulic interface" from control device 18 to activation device 20. The transmission of the driver braking input specification via the "hydraulic interface" from control device 18 to activation device 20 is also still possible, even in the case of a simultaneous failure of electrical networks 22 and 24. Activation device 20 is thus still able to activate second motor 14a of second motorized pressure build-up device 14 according to the instantaneous driver braking input specification in spite of a simultaneous failure of electrical networks 22 and 24, even if second motorized pressure build-up device 14 has no separate braking input detection unit.

Similarly, at least one setpoint operating parameter established by control device 18 relating to a setpoint operating mode to be carried out with the aid of second motorized pressure build-up device 14 may also be transmitted as the at least one first piece of information to activation device 20. Control device 18 may assign, in particular, in the so-called master status, activation device 20 present in a slave status the setpoint operating mode to be carried out by second motorized pressure build-up device 14 in such a way that an operation of first motorized pressure build-up device 12 is assisted with the aid of second motorized pressure build-up device 14. An excessive load of one of motorized pressure build-up devices 12 and 14 may be avoided in this way. This extends the service lives of motorized pressure build-up devices 12 and 14.

As an alternative or an addition, at least one error message relating to an error present at control device 18 and/or at least one component of first motorized pressure build-up device 12 may also be transmitted as the at least one first piece of information to activation device 20. Thus, activation device 20 may, if necessary, adapt the operation of second motorized pressure build-up device 14, even to a complete failure of at least one of the two devices 12 and 18.

As an advantageous refinement of the present invention, activation device 20 may also be designed to output at least one second piece of information to control device 18 in that activation device 20 is designed, under consideration of the respective second piece of information, to activate second motor 14a of second motorized pressure build-up device 14 in such a way that, with the aid of the operation of the activated second motor 14a, pressure p prevailing in at least partial volume 16 of braking system 10 varies in accordance with a pressure change signal $\Delta p_2$, which is interpretable as the respective second piece of information for control device 18 using a first pressure sensor unit 12b of first motorized pressure build-up device 12. In the case of pressure change signal $\Delta p_2$ as well, a difference between its minimal values and maximum values may, for example, be between 1 bar to 10 bar, preferably between 1 bar to 5 bar. In this case as well, control device 18 is preferably also designed to receive the at least one second piece of information output by activation device 20. In this case, control device 18, once first pressure sensor unit 12b detects pressure change signal $\Delta p_2$ effectuated (and corresponding to the output second piece of information) with the aid of the operation of second motor 14a of second motorized pressure build-up device 14 in at least partial volume 16 of braking system 10 and outputs a sensor signal $S_{12b}$ corresponding to detected pressure change signal $\Delta p_2$ to control device 18, is designed to read out the corresponding second piece of information from output sensor signal $S_{12b}$.

Activation device 20 may in particular, be designed to output a plurality of second pieces of information to control device 18 and control device 18 may be designed to receive the plurality of second pieces of information from activation device 20. If necessary, for example, for each second piece of information of the plurality of second pieces of information, one pressure change instruction each relating to pressure change signal $\Delta p_2$ interpretable as the respective second piece of information for control device 18 is stored on second memory unit 20a of activation device 20, activation device 20 then being designed, under consideration of the pressure change instruction read out in each case from second memory unit 20a, to activate second motor 14a in such a way that pressure p prevailing in at least partial volume 16 of the braking system is varied with the aid of the operation of activated second motor 14a in accordance with corresponding pressure change signal $\Delta p_2$. The advantageous design of control device 18 for receiving the plurality of second pieces of information is also easily implementable by storing on first memory unit 18a of control device 18 the corresponding second piece of information for each sensor signal $S_{12b}$ output by first pressure sensor unit 12b to control device 18 in response to a detected pressure change signal $\Delta p_2$ (corresponding to one of the plurality of second pieces of information), control device 18 in this case being designed to read out the second piece of information stored for the respective sensor signal $S_{12b}$ from first memory unit 18a . The refinement of control device 18 and activation device 20 for transmitting a plurality of second pieces of information from activation device 20 to control device 18 is thus easily implementable.

The refinement of control device 18 and activation device 20 described in the preceding paragraph thus enables a bidirectional information exchange between control device 18 and activation device 20 via the "hydraulic interface." The communication between control device 18 and activation device 20 implemented in this way, since it is possible even during a simultaneous failure of electrical networks 22 and 24, may be referred to as a redundant communication or as an expanded communication for the case of failure. At least one of the electrical networks 22 and 24 schematically depicted in FIG. 1a may be conserved in this case. Frequently, however, the refinement described in the preceding paragraph may also be dispensed with.

For example, at least one setpoint operating parameter relating to a setpoint operating mode to be carried out with the aid of first motorized pressure build-up device 12 established by activation device 20 as the at least one second piece of information may also be transmitted to control device 18. The master status and the slave status may thus be arbitrarily established or exchangeable between devices 18 and 20. In addition, at least one error message relating to an error present at activation device 20 and/or at least one component of second motorized pressure build-up device 14 may also be transmitted as the at least one second piece of information to control device 18. Devices 18 and 20 are thus able to adapt their functionalities and those of motorized pressure build-up devices 12 and 14 to a multitude of error scenarios. At least one measured value ascertained with the aid of a sensor system of second motorized pressure build-up device 14 or provided to second motorized pressure build-up device 14 may also be transmitted as the at least one second piece of information.

An x-axis is depicted in the coordinate system of FIG. 1b as a time axis t (in seconds), while pressure p (in bar) prevailing in at least partial volume 16 of braking system 10 is depicted with the aid of a y-axis.

Pressure change signal $\Delta p_1$ is plotted in the coordinate system of FIG. 1b. It is apparent that in the specific embodiment of FIG. 1a and 1b, control device 18 is designed, for example, under consideration of the respective first piece of information, to activate motor 12a in such a way that, with the aid of the operation of the activated first motor 12a, pressure p prevailing in partial volume 16 of braking system 10 is varied according to a binary pressure change signal $\Delta p_1$, which is interpretable using second pressure unit 14b as the respective first piece of information for activation device 20. Pressure change signal $\Delta p_2$ effectuated with the aid of the operation of activated second motor 14a may also be a binary pressure change signal $\Delta p_2$.

Figure 2:
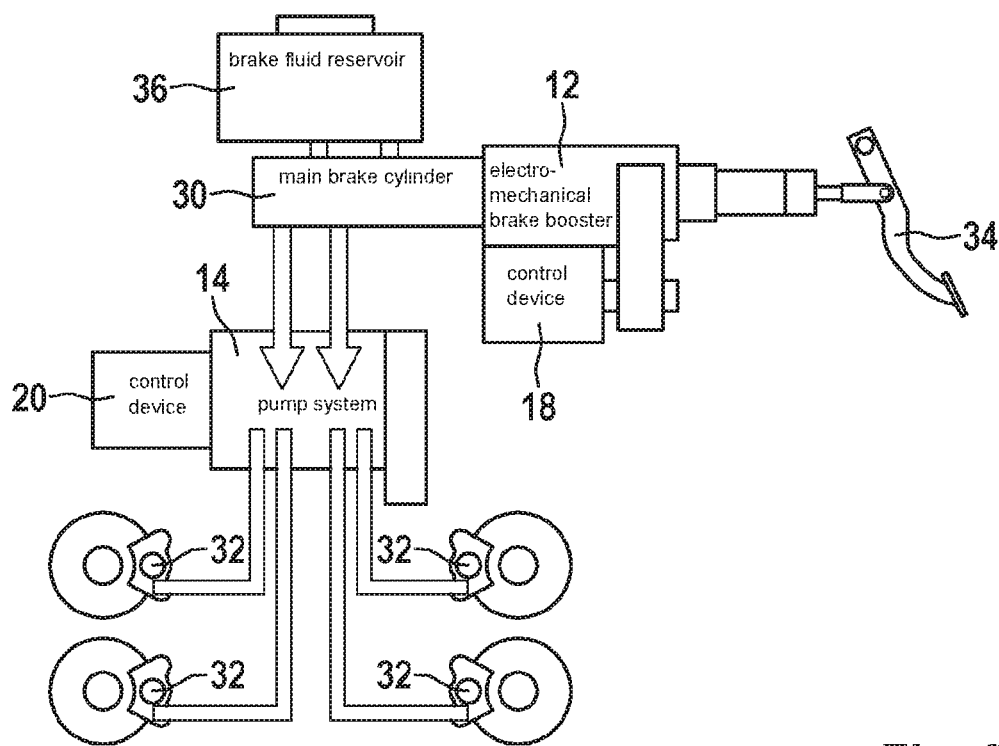
FIG. 2 schematically shows a representation of one specific embodiment of the braking system for a vehicle in accordance with an example embodiment of the present invention.

FIG. 2 schematically shows a representation of one specific embodiment of the braking system for a vehicle in accordance with the present invention.

The braking system schematically represented in FIG. 2 includes an electromechanical brake booster 12 positioned upstream from a main brake cylinder 30 of the braking system and a pump system/hydraulic system 14 including at least one pump as motorized pressure build-up devices 12 and 14. Pump system 14 may, for example, be an ABS system or an ESP system (ESC system). Motorized pressure build-up devices 12 and 14 are equipped with above-described control devices 18 and 20. Each control device 18 and 20 may be a sub-unit of its motorized pressure build-up device 12 or 14 or may be installed separately from its motorized pressure build-up device 12 or 14. Alternatively or in addition, the braking system may also encompass a motorized piston-cylinder device such as, for example, an integrated power brake (IPB) including one of devices 18 or 20. In place of at least one of its wheel brake cylinders 32, the braking system may also include one electrical wheel brake each with one of devices 18 or 20. (The at least one electrical wheel brake may be easily equipped with a separate pressure sensor.) A brake pedal 34 and a brake fluid reservoir 36 are also depicted in FIG. 2 as further components of the braking system.

The braking systems of FIGS. 1 and 2 may also be advantageously used (as a "driver assistance system") for the semi-automated or automated deceleration of the vehicle/motor vehicle equipped therewith due to the advantageous interaction of its devices 18 and 20 for implementing the "hydraulic interface". The two devices 18 and 20 may also be part of a system for the automated or semi-automated driving (encompassing an autonomous or semi-autonomous drive of the vehicle/motor vehicle). Even during a temporary absence of responsibility of the driver or during a total absence of the driver, it is possible to reliably decelerate the vehicle/motor vehicle with the aid of the two devices 18 and 20 and their motorized pressure build-up devices 12 and 14, even a complete electrical communication failure at the vehicle/motor vehicle being capable of being reliably bridged with the aid of the "hydraulic interface."

Figure 3:
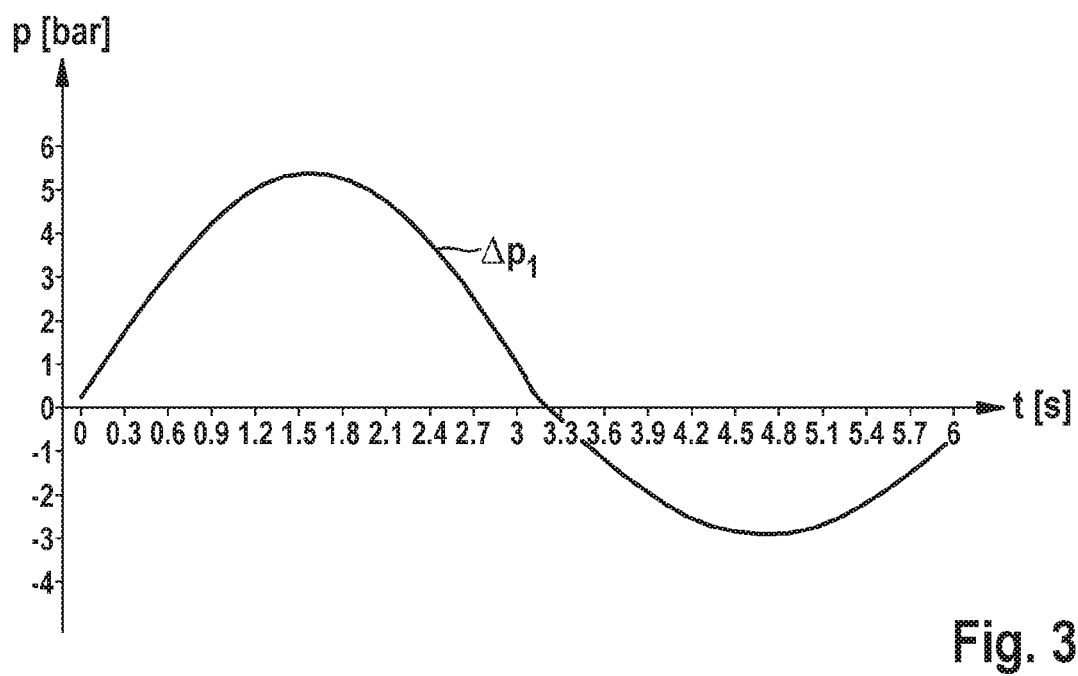
FIG. 3 shows a coordinate system for explaining one specific embodiment of the method for transmitting at least one piece of information between two motorized pressure build-up devices of the braking system of a vehicle, in accordance with an example embodiment of the present invention.

FIG. 3 shows a coordinate system for explaining one specific embodiment of the method for transmitting at least one piece of information between two motorized pressure build-up devices of a braking system of a vehicle.

In carrying out the method, a first motor of a first motorized pressure build-up device is activated, under consideration of the respective information, in such a way that, with the aid of the operation of the activated first motor, a pressure p prevailing in at least one partial volume of the braking system is varied in accordance with a pressure change signal $\Delta p_1$, which is interpretable as the respective information for an activation device of the second motorized pressure build-up device using a pressure sensor unit of the second motorized pressure build-up device. In the coordinate system of FIG. 3, an x-axis is depicted as a time axis t (in seconds) whereas pressure p prevailing in at least the partial volume of the braking system is depicted (in bar) with the aid of a y-axis. Pressure change signal $\Delta p_1$ is plotted in the coordinate system of FIG. 1b. Thus, at least one sinusoidal signal, instead of or in addition to a binary signal, may also be transmitted via the "hydraulic interface."

Pressure change signal $\Delta p_1$ effectuated in at least the partial volume of the braking system is detected with the aid of the pressure sensor unit of the second motorized pressure build-up device and a sensor signal corresponding to the pressure change signal is output with the aid of the pressure sensor unit to the activation device. The information corresponding to the output sensor signal is subsequently read out with the aid of the activation device. Thus, the method described herein also yields the aforementioned advantages. The method may also encompass the further processes described above.

Examples of the motorized pressure build-up devices are already enumerated above. A feasibility of the method described herein is also not limited to any particular braking system type of the braking system, nor to any specific vehicle type/motor vehicle type of a vehicle/motor vehicle equipped with the braking system.

What is claimed is:

1. A control device for a first motorized pressure build-up device of a braking system of a vehicle, the control device configured to:

activate a first motor of the first motorized pressure build-up device in such a way that a pressure prevailing in at least one partial volume of the braking system is variable using an operation of the activated first motor; and output at least one first piece of information to an activation device of a second motorized pressure build-up device of the braking system in that the control device is configured to, under consideration of the first piece of information, activate the first motor in such a way that, using the operation of the activated first motor, the pressure prevailing in at least the partial volume of the braking system is varied using the operation of the activated first motor in accordance with a pressure change signal, which is interpretable as the first piece of information for the activation device using a second pressure sensor unit of the second motorized pressure build-up device, wherein for the at least one first piece of information, one pressure change instruction each relating to the pressure change signal interpretable as the first piece of information for the activation device is stored on a first memory unit of the control device, and the control device is configured to, in consideration of the first pressure change instruction read out in each case from the first memory unit, activate the first motor in such a way that, using the operation of the activated first motor, the pressure prevailing in at least the partial volume of the braking system is varied in accordance with the corresponding pressure change signal.

2. The control device as recited in claim 1, wherein the control device is configured to, under consideration of the first piece of information, activate the first motor in such a way that, using the operation of the activated first motor, the pressure prevailing in at least the partial volume of the braking system is varied in accordance with a sinusoidal or binary pressure change signal, which is interpretable as the first piece of information for the activation device using the second pressure sensor unit.

3. The control device as recited in claim 1, wherein: (i) a driver braking input specification relating to a driver braking input signaled by a driver using an actuation of a brake actuation element of the vehicle ascertained by at least one braking input detection unit of the first motorized pressure build-up device, and/or (ii) at least one setpoint operating parameter established by the control device relating to a setpoint operating mode to be carried out using the second motorized pressure build-up device, and/or (iii) at least one error message relating to an error present at the control device, and/or at at least one component of the first motorized pressure build-up device, is outputtable as the at least one first piece of information to the activation device of the second motorized pressure build-up device.

4. An activation device for a second motorized pressure build-up device of the braking system for interacting with a control device, the control device configured to activate a first motor of a first motorized pressure build-up device in such a way that a pressure prevailing in at least one partial volume of the braking system is variable using an operation of the activated first motor, and to output at least one first piece of information to the activation device of the second motorized pressure build-up device of the braking system in that the control device is configured to, under consideration of the first piece of information, activate the first motor in such a way that, using the operation of the activated first motor, the pressure prevailing in at least the partial volume of the braking system is varied using the operation of the activated first motor in accordance with a pressure change signal, which is interpretable as the first piece of information for the activation device using a second pressure sensor unit of the second motorized pressure build-up device, wherein the activation device is configured to:
  activate, under consideration of a sensor signal output by the second pressure sensor unit of the second motorized pressure build-up device, a second motor of the second motorized pressure build-up device in such a way that the pressure prevailing in at least the partial volume of the braking system is variable using an operation of the activated second motor; and
  receive the at least one first piece of information output by the control device of the first motorized pressure build-up device in that, once the second pressure sensor unit detects the pressure change signal effectuated using the operation of the first motor of the first motorized pressure build-up device in at least the partial volume of the braking system, and outputs a sensor signal corresponding to the detected pressure change signal to the activation device, the activation device is configured to read out the first piece of information from the output sensor signal, wherein for the at least one first piece of information, one pressure change instruction each relating to the pressure change signal interpretable as the first piece of information for the activation device is stored on a first memory unit of the control device, and the control device is configured to, in consideration of the first pressure change instruction read out in each case from the first memory unit, activate the first motor in such a way that, using the operation of the activated first motor, the pressure prevailing in at least the partial volume of the braking system is varied in accordance with the corresponding pressure change signal.

5. The activation device as recited in claim 4, wherein the activation device is also configured to output at least one second piece of information to the control device of the first motorized pressure build-up device in that the activation device is configured to, in consideration of the second piece of information, activate the second motor in such a way that, using the operation of the activated second motor, the pressure prevailing in at least the partial volume of the braking system is varied using the operation of the activated second motor in accordance with a second pressure change signal, which is interpretable as the second piece of information for the control device using a first pressure sensor unit of the first motorized pressure build-up device.

6. The activation device as recited in claim 4, wherein the first piece of information for the respective sensor signal corresponding to the pressure change signal is stored on a second memory unit of the activation device, the activation device being configured to read out the first piece of information stored for the respective sensor signal from the second memory unit.

7. A system, comprising:
  a control device for a first motorized pressure build-up device of a braking system of a vehicle, the control device configured to:
    activate a first motor of the first motorized pressure build-up device in such a way that a pressure prevailing in at least one partial volume of the braking system is variable using an operation of the activated first motor, and
    output at least one first piece of information to an activation device of a second motorized pressure build-up device of the braking system in that the control device is configured to, under consideration of the first piece of information, activate the first motor in such a way that, using the operation of the activated first motor, the pressure prevailing in at least the partial volume of the braking system is varied using the operation of the activated first motor in accordance with a pressure change signal, which is interpretable as the first piece of information for the activation device using a second pressure sensor unit of the second motorized pressure build-up device; and
  the activation device for the second motorized pressure build-up device of the braking system for interacting with the control device, the activation device configured to:
    activate, under consideration of a sensor signal output by the second pressure sensor unit of the second motorized pressure build-up device, a second motor of the second motorized pressure build-up device in such a way that the pressure prevailing in at least the partial volume of the braking system is variable using an operation of the activated second motor, and
    the at least one first piece of information output by the control device of the first motorized pressure build-up device in that, once the second pressure sensor unit detects the pressure change signal effectuated using the operation of the first motor of the first motorized pressure build-up device in at least the partial volume of the braking system, and outputs a sensor signal corresponding to the detected pressure change signal to the activation device, the activation device is configured to read out the first piece of information from the output sensor signal;
  wherein the control device is also configured to receive at least one second piece of information output by the activation device of the second motorized pressure build-up device in that, once a first pressure sensor unit of the first motorized pressure build-up device detects the second pressure change signal effectuated using the operation of the second motor of the second motorized pressure build-up device in at least the partial volume of the braking system, and a sensor signal corresponding to the detected second pressure change signal is output to the control device, the control device is configured to read out the second piece of information from the output sensor signal, and
  wherein for the at least one first piece of information, one pressure change instruction each relating to the pressure change signal interpretable as the first piece of information for the activation device is stored on a first memory unit of the control device, and the control device is configured to, in consideration of the first pressure change instruction read out in each case from the first memory unit, activate the first motor in such a way that, using the operation of the activated first motor, the pressure prevailing in at least the partial volume of the braking system is varied in accordance with the corresponding pressure change signal.

8. A motorized pressure build-up device for a braking system of a vehicle, comprising:
  a control device configured to:
    activate a first motor of a first motorized pressure build-up device in such a way that a pressure prevailing in at least one partial volume of the braking system is variable using an operation of the activated first motor; and
    output at least one first piece of information to an activation device of a second motorized pressure build-up device of the braking system in that the control device is configured to, under consideration of the first piece of information, activate the first motor in such a way that, using the operation of the activated first motor, the pressure prevailing in at least the partial volume of the braking system is varied using the operation of the activated first motor in accordance with a pressure change signal, which is interpretable as the first piece of information for the activation device using a second pressure sensor unit of the second motorized pressure build-up device, wherein for the at least one first piece of information, one pressure change instruction each relating to the pressure change signal interpretable as the first piece of information for the activation device is stored on a first memory unit of the control device, and the control device is configured to, in consideration of the first pressure change instruction read out in each case from the first memory unit, activate the first motor in such a way that, using the operation of the activated first motor, the pressure prevailing in at least the partial volume of the braking system is varied in accordance with the corresponding pressure change signal.

9. The motorized pressure build-up device as recited in claim 8, wherein the motorized pressure build-up device is an electromechanical brake booster positionable or positioned upstream from a main brake cylinder of the brake system, or a pump system including at least one pump, or a motorized piston-cylinder device, or an integrated power brake or an electrical wheel brake.

10. A braking system for a vehicle, comprising:
a first motorized pressure build-up device including a control device, the control device configured to:
activate a first motor of the first motorized pressure build-up device in such a way that a pressure prevailing in at least one partial volume of the braking system is variable using an operation of the activated first motor, and
output at least one first piece of information to an activation device of a second motorized pressure build-up device of the braking system in that the control device is configured to, under consideration of the first piece of information, activate the first motor in such a way that, using the operation of the activated first motor, the pressure prevailing in at least the partial volume of the braking system is varied using the operation of the activated first motor in accordance with a pressure change signal, which is interpretable as the first piece of information for the activation device using a second pressure sensor unit of the second motorized pressure build-up device, wherein for the at least one first piece of information, one pressure change instruction each relating to the pressure change signal interpretable as the first piece of information for the activation device is stored on a first memory unit of the control device, and the control device is configured to, in consideration of the first pressure change instruction read out in each case from the first memory unit, activate the first motor in such a way that, using the operation of the activated first motor, the pressure prevailing in at least the partial volume of the braking system is varied in accordance with the corresponding pressure change signal; and
the second motorized pressure build-up device.

11. A method for transmitting at least one piece of information between two motorized pressure build-up devices of a braking system of a vehicle, the method comprising the following steps:
activating a first motor of a first motorized pressure build-up device, under consideration of the piece of information, in such a way that, using an operation of the activated first motor, a pressure prevailing in at least a partial volume of the braking system is varied using an operation of the activated first motor in accordance with a pressure change signal, which is interpretable as the piece of information for an activation device of a second motorized pressure build-up device using a pressure sensor unit of the second motorized pressure build-up device, wherein for the at least one piece of information, one pressure change instruction each relating to the pressure change signal interpretable as the at least one piece of information for the activation device is stored on a first memory unit of the control device, and the control device is configured to, in consideration of the first pressure change instruction read out in each case from the first memory unit, activate the first motor in such a way that, using the operation of the activated first motor, the pressure prevailing in at least the partial volume of the braking system is varied in accordance with the corresponding pressure change signal;
detecting the pressure change signal effectuated in at least the partial volume of the braking system and outputting a sensor signal corresponding to the pressure change signal to the activation device using the pressure sensor unit of the second motorized pressure build-up device; and
reading out the piece of information corresponding to the output sensor signal using the activation device.

12. A control device for a first motorized pressure build-up device of a braking system of a vehicle, the control device configured to:
activate a first motor of the first motorized pressure build-up device in such a way that a pressure prevailing in at least one partial volume of the braking system is variable using an operation of the activated first motor; and
output at least one first piece of information to an activation device of a second motorized pressure build-up device of the braking system in that the control device is configured to, under consideration of the first piece of information, activate the first motor in such a way that, using the operation of the activated first motor, the pressure prevailing in at least the partial volume of the braking system is varied using the operation of the activated first motor in accordance with a pressure change signal, which is interpretable as the first piece of information for the activation device using a pressure sensor unit of the second motorized pressure build-up device, wherein the pressure change signal is transmitted from the first motor and through the at least partial volume to the pressure sensor unit.

13. A method for transmitting at least one piece of information between two motorized pressure build-up devices of a braking system of a vehicle, the method comprising the following steps:
activating a first motor of a first motorized pressure build-up device, under consideration of the piece of information, in such a way that, using an operation of the activated first motor, a pressure prevailing in at least a partial volume of the braking system is varied using the operation—of the activated first motor in accordance with a pressure change signal, which is interpretable as the piece of information for an activation device of a second motorized pressure build-up device using a pressure sensor unit of the second motorized pressure build-up device, wherein the pressure change signal is transmitted from the first motor and through the at least partial volume to the pressure sensor unit;

detecting the pressure change signal effectuated in at least the partial volume of the braking system and outputting a sensor signal corresponding to the pressure change signal to the activation device using the pressure sensor unit of the second motorized pressure build-up device; and reading out the piece of information corresponding to the output sensor signal using the activation device.

* * * * *